United States Patent [19]
Jones et al.

[11] Patent Number: 4,507,794
[45] Date of Patent: Mar. 26, 1985

[54] FILTERED MANCHESTER CODED PSK TRANSMISSION SYSTEM

[76] Inventors: Stephen K. Jones, 2204 Heather Hill, Plano, Tex. 75075; Donald A. Johnston, 1609 Hartford, Carrollton, Tex. 75007

[21] Appl. No.: 491,605

[22] Filed: May 4, 1983

[51] Int. Cl.³ ............................................. H04B 1/12
[52] U.S. Cl. ...................................... 375/55; 375/58; 340/347 DD
[58] Field of Search ...................... 375/17, 18, 55, 87, 375/94, 103, 58; 340/347 DD; 360/45; 364/724

[56] References Cited

U.S. PATENT DOCUMENTS

| | | | |
|---|---|---|---|
| 3,419,804 | 12/1968 | Gorog et al. | 375/55 |
| 3,947,767 | 3/1976 | Koike et al. | 375/18 |
| 4,123,710 | 10/1978 | Stuart et al. | 375/18 |
| 4,135,057 | 1/1979 | Bayless, Sr. et al. | 375/58 |
| 4,439,863 | 3/1984 | Bellamy | 375/18 |

*Primary Examiner*—Robert L. Griffin
*Assistant Examiner*—Stephen Chin
*Attorney, Agent, or Firm*—Jerry W. Mills; Gregory M. Howison; Nina L. Medlock

[57] ABSTRACT

A system for digital transmission includes an active pulse forming network to convert a digital data signal into a Manchester Coded PSK format. A low pass filter network is provided to transform the Manchester Coded signal for transmission over a bandlimited wireline channel. The receiver includes a low pass filter and a bandpass filter that combine to form an overall bandpass filter response for receiving the output of the wireline channel. The transmitter low pass filter and the receiver bandpass filter combine to transform the Manchester Coded PSK data signal into a quasi-raised cosine signal that has the digital data signal coded therein. A timing recovery circuit is included that extracts a timing signal from the quasi-raised cosine signal to provide a coherent timing signal such that the quasi-raised cosine signal can be sampled and the digital data signal reconstructed. The timing recovery circuit delays the quasi-raised cosine signal and multiplies it by the reconstructed digital data signal and the product signal thereof is half-wave rectified and input to a phase lock loop which locks onto the signal to provide a reconstructed timing signal to drive a sampling circuit.

10 Claims, 25 Drawing Figures

FILTERED MANCHESTER CODED PSK TRANSMISSION SYSTEM

TECHNICAL FIELD

The present invention relates in general to digital signal transmission and, in particular, to a communication system for transmitting Manchester Coded PSK data.

BACKGROUND OF THE INVENTION

In bandlimited communication systems, various techniques have been employed to operate within the restrictions imposed by the particular type of transmission system chosen. These transmission systems present difficulties at both the very low end of the frequency spectrum and at the high end of the frequency spectrum. This is due to the fact that coupling onto a transmission line, such as coax, is sometimes accomplished through the use of transformers. This results in the loss of the DC component of the signal which for some digital coding schemes is a necessity. To reconstitute the DC component requires sophisticated DC recovery circuits.

One digital transmission system for operation over a bandlimited communication channel has been described in U.S. Pat. No. 4,135,057 issued to J. W. Bayless. The Bayless patent utilizes a carrier frequency to transmit a raised cosine pulse. The raised cosine pulse is the result of driving a selected transfer function with a pulse waveform having a positive going pulse representative of a logic "high" and a negative going pulse representative of a logic "low". The transfer function is the result of cascading a transmitter transfer function, a channel transfer function and a receiver transfer function such that the overall system results in a matched filter. This matched filter reduces intersymbol interference to allow for optimum retrieval of the data.

In a wireline transmission system, such as a coax line, the noise spectral density tends to be higher for the low frequencies. In addition, the normal mode of coupling into a wireline transmission system is by a device such as a transformer which introduces further attenuation at the low frequencies. This presents disadvantages in that some transmission methods require transmission of low frequency components to maintain signal integrity. Attenuation of these low frequency components results in increased intersymbol interference and increased signal-to-noise ratio.

In view of the above problem with the prior art, there exists a need for a system that operates over a wireline channel employing transformer coupling and is operable to eliminate the need for a low frequency component to maintain signal integrity.

DETAILED DESCRIPTION OF THE DRAWINGS

SUMMARY OF THE INVENTION

The present invention disclosed and claimed herein includes a method for digital transmission by coding a digital data signal into a bandpass type format, the coded signal transformed with a bandpass type transfer function. The transformed signal is then coherently sampled to reconstruct the digital data signal.

In another aspect of the present invention, the coded data signal is passed through a first transformation network having a first transfer function and then transmitted over a communications channel. The output of the communications channel is received by a second transformation network having a second transfer function to transform the received signal into superimposed raised cosine signals having equal and opposite polarities and shifted in time by the signalling rate thereof. The output of the second transformation network is input to a third transformation network having a third transfer function to transform the coded data signal into a quasi-raised cosine signal.

DETAILED DESCRIPTION OF THE INVENTION

Figure 1:
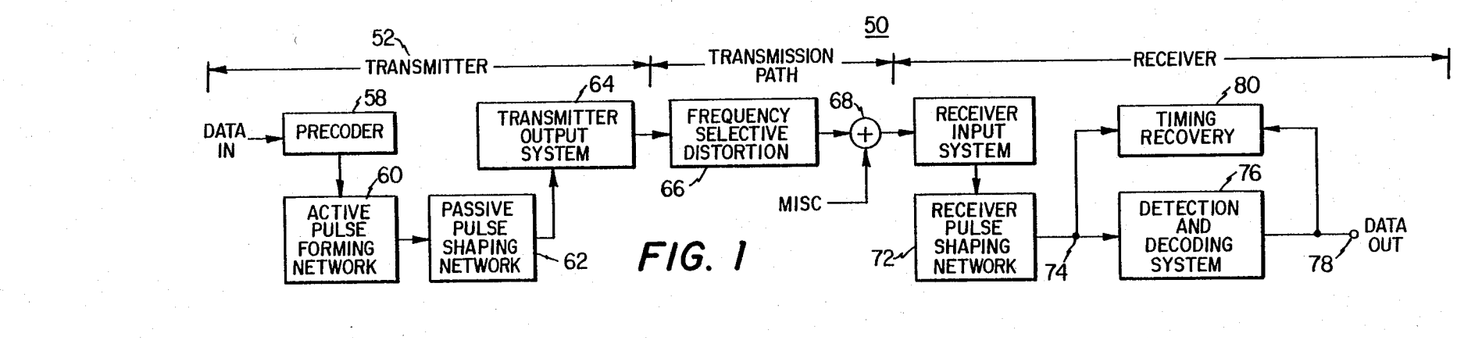
FIG. 1 illustrates a schematic block diagram of the filtered Manchester Coded PSK transmission system of the present invention.

Referring to FIG. 1, there is shown a schematic block diagram of a Manchester Coded PSK transmission system 50 of the present invention having a transmitter 52 and a receiver 54. The transmitter 52 transmits along a transmission path 56. The transmitter 52 has a precoder 58 that receives a stream of input bits that arrive at a rate of N/T bits per second. The precoder 58 can provide differential encoding of the data stream to support carrier recovery in detection operations at the receiver 54. The precoded data is passed to an active pulse forming network 60 that formats the data into a Manchester Coded PSK format. The Manchester Coded PSK data is then input to a passive pulse shaping network 62 to transform the coded data for transmission along the transmission path 56 as will be described hereinbelow. A transmitter output system 64 is operable to couple the transmitter data to the transmission path 56. The output system 64 can consist of amplifiers and couplers depending upon the type of transmission path 56 utilized.

The transmission path 56 has a frequency selective distortion 66 present which represents the channel response of a given transmission path. A summation junction 68 represents the summation of noise into the system due to various external and internal sources. Depending upon the type of transmission path employed, the response of the frequency selective distortion 66 will vary.

Figure 14:
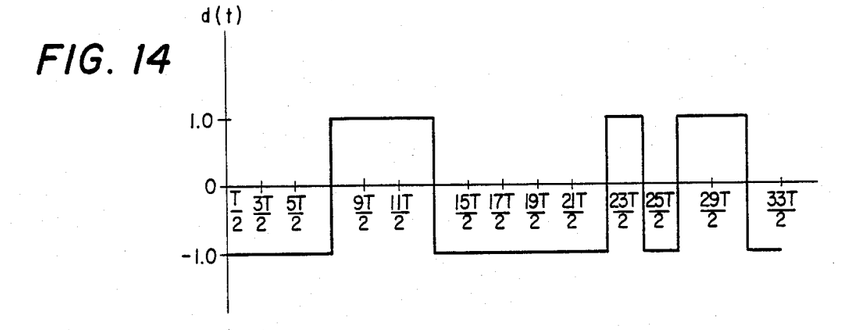
FIG. 14 illustrates the binary antipodal data signal at the output of the receiver.

The data output from the transmission path 56 is input to a receiver input system 70 that couples the data on the transmission path 56 to a receiver pulse shaping network 72. The receiver input system 70 can consist of couplers and low noise amplifiers that extract the transmitted data from the transmission path 56 with minimal disruption of the signal integrity. The receiver pulse shaping network 72 provides the necessary transfer function to achieve the proper data signal on an output node 74. The signal on the output node 74 is input to a detection and decoding system 76 that processes the signal on the output node 74 to determine whether a "high" logic state or a "low" logic state is present. The detection and decoding system 76 outputs an antipodal data stream on an output terminal 78. An antipodal data stream is a stream of data having a logic "high" represented by a positive value and a logic "low" represented by a negative value. A typical antipodal data stream is illustrated in FIG. 14 for the logic data in Table 1, as will be described hereinbelow. A timing recovery circuit 80 processes the signal on the node 76 and the signal on the output terminal 78 to recover the frequency of the transmitter 52 to provide a synchronization signal for the received data. The output of the timing recovery circuit 80 is input to the detection and decoding system 76 to provide for overall coherent detection of the data.

OPTIMUM PARTITIONING OF PULSE SHAPING AND EQUALIZATION FILTERS

In order to transmit data along any transmission path without disrupting signal integrity, it is good engineering practice well known in the art to provide a matched filter system. This is accomplished by designing the system such that the transmitter characteristics, the receiver characteristics and the transmission path characteristics provide an overall matched system transfer function. Normally, the selection of the transmission path sets the constraints for the transfer function of the channel. It is only necessary then to design the transmitter and receiver transfer functions to compliment the channel transfer function. In addition, the frequency spectrum of the received data must also be considered since the overall transfer function must pass the data without disrupting signal integrity.

A common technique utilized to arrive at the transmitter and receiver transfer functions is to partition the individual transfer functions and design each of them separately. This technique is described in U.S. Pat. No. 4,135,057 and essentially consists of designing matched filters for both the transmitter and receiver.

Figure 2:
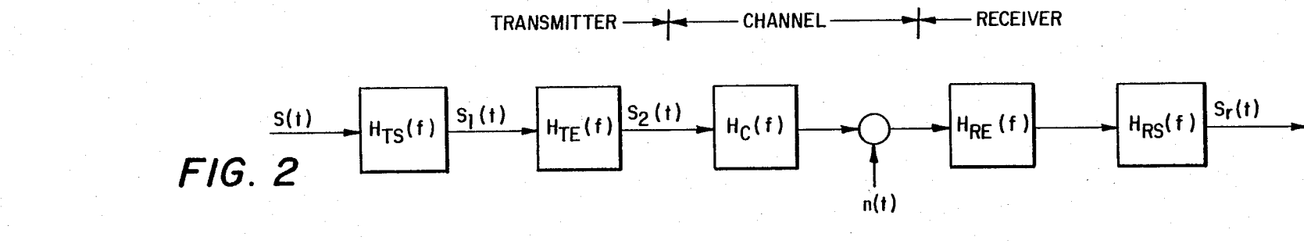
FIG. 2 illustrates a partitioning of the transmit and receive filters of a cascade of filters.

Referring now to FIG. 2, there is shown a block diagram of the transfer function representing the passive pulse shaping network 62 and the receiver pulse shaping network 72 of FIG. 1 with the addition of the transfer function of the transmission path 56. The various transfer functions depict the partitioning of transmit and receive filters as a cascade of filters. The additive noise n(t) is assumed Gaussian with power spectral density w(f). The transmitter is represented by a transfer function $H_{TS}(f)$ that transforms the input signal to $s_1(t)$ and an equalization filter transfer function $H_{TE}(f)$ that transforms the signal $s_1(t)$ to a signal $s_2(t)$. The receiver consists of an equalizer filter transfer function $H_{RE}(f)$ that transforms the transmitted signal for input to a receive filter transfer function $H_{RS}(f)$ that outputs a signal $s_r(t)$.

The transmitter transfer function consists of the cascading of the transfer functions $H_{TS}(f)$ and $H_{TE}(f)$. The purpose of $H_{TE}(f)$ is to provide phase equalization in real networks. Phase equalizer networks are generally designed for use in conjunction with specific filter networks. When reference is made herein to frequency transfer functions, unless explicitly stated otherwise, these functions are understood to include the combination of filter and equalizer functions. In a similar manner, the receiver transfer functions $H_{RE}(f)$ and $H_{RS}(f)$ are cascaded to provide one receiver transfer function.

The filters providing the transfer functions $H_{TE}(f)$ and $H_{RE}(f)$ are designed to equalize the frequency selective effects of the channel which is represented by a transfer function $H_C(f)$. These transfer functions are constrained by:

$$H_{TE}(f)H_{RE}(f)H_C(f) = G_o e^{-j2\pi f T_1} \tag{1}$$

where:
  $G_o$ is a real gain term and
  $T_1$ is a time delay.
For simplicity of presentation, $T_1 = 0$ will be assumed.

At the receiver, the output signal $s_r(t)$ is sampled such that there is a high probability of detecting the correct logic state. It is desired that the receiver output pulse be equal to $E_s s(t)$, where $s(t)$ has unit amplitude at the sampling instant and $E_s$ is an amplitude term. Consequently, if the equalizer transfer functions $H_{TE}(f)$ and $H_{RE}(f)$ are as specified above, the signal $s_1(t)$ that is transformed by the transmit filter transfer function $H_{TS}(f)$ must have a Fourier transform $S_1(f)$ given by:

$$S_1(f) = \frac{E_s S(f)}{G_o H_{RS}(f)} \tag{2}$$

where $S(f)$ represents the Fourier transform of $S(t)$.

To determine the optimal choices for the transfer functions $H_{TE}(f)$, $H_{RE}(f)$, $H_{TS}(f)$, and $H_{RS}(f)$, it is noted that the probability of error is a monitonic function of the ration $W_N/E_s^2$, where $W_n$ is the power of the noise component at the output of the receive filter transfer function $H_{RS}(f)$. The equation defining $W_n$ is:

$$W_n = \int_0^\infty |H_{RE}(f)H_{RS}(f)|^2 w(f) df \tag{3}$$

Where w(f) is the power spectral density of the additive noise.

Calculating the average signal power $W_s$ supplied to the transmission path for a random sequence of equally likely positive and negative pulses having a baud rate of $F_s$ $$W_s = \frac{2f_s E_s}{G_o^2} 2 \int_o^\infty \frac{S^2(f)|H_{TE}(f)|^2}{|H_{RS}(f)|^2} df \qquad (4)$$

it follows that:

$$\frac{1}{E_s^2} = \frac{2f_s}{W_s G_o^2} \int_o^\infty \frac{S^2(f)|H_{TE}(f)|^2}{|H_{RS}(f)|^2} df \qquad (5)$$

The calculus of variations may be employed to minimize the ratio $W_n/E_S^2$ yielding the following partition:

$$|H_{RS}(f) H_{RE}(f)| = \frac{\alpha \sqrt{S(f)}}{w^{\frac{1}{4}}(f) \sqrt{|H_c(f)|}} \qquad (6)$$

where:

$$\alpha^2 = \frac{2f_s E_s^2}{W_s} \int_o^\infty \frac{S(f)\sqrt{w(f)}}{|H_c(f)|} df \qquad (7)$$

It should be understood that the filter may have any convenient phase function, and the performance will remain optimal.

The pulse $s_2(t)$ at the channel input has a Fourier transform $s_2(f)$ given by $$S_2(f) = \frac{E_s \sqrt{S(f)} \, w^{\frac{1}{4}}(f)}{\alpha \sqrt{|H_c(f)|}} \qquad (8)$$

Calculation of the resulting minimal value of $W_n/E_S^2$ yields:

$$\left.\frac{W_n}{E_s^2}\right|_{min} = \frac{2F_s}{W_s} \left[\int_o^\infty \frac{S(f)\sqrt{w(f)}}{|H_c(f)|} df\right]^2 \qquad (9)$$

which is the expression for the minimum attainable signal-to-noise ratio. This expression indicates that the receiver output pulse should be chosen such that its spectrum is largest in those regions where the ratio of the w(f) to absolute value of $|H_c(f)|$ is smallest, that is, the signal component should be concentrated in those regions where there is less noise and less channel attenuation. In a data system that transmits a sequence of digits, intersymbol interference considerations also enter into the choice of the receiver output pulse.

THE WIRELINE CHANNEL

Figure 3:
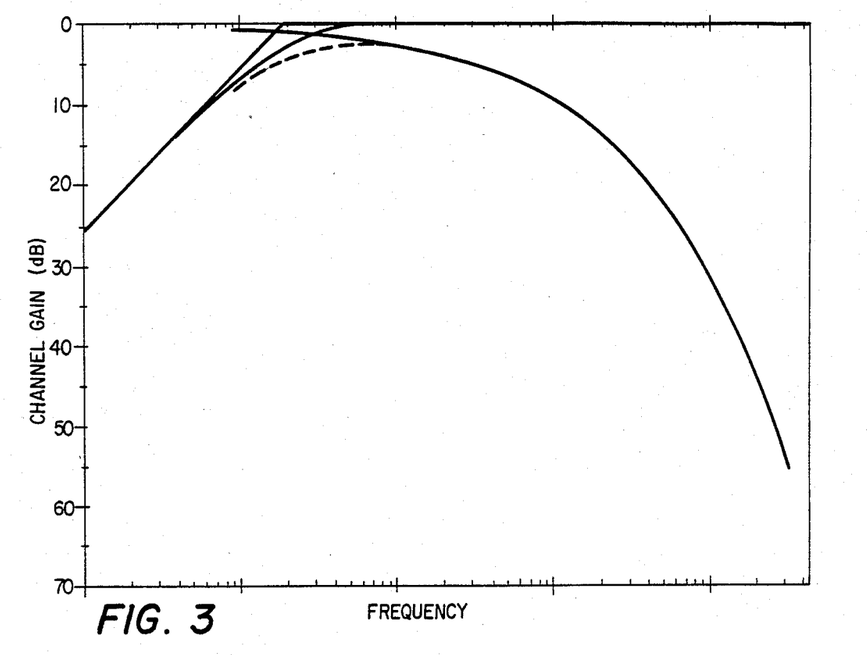
FIG. 3 illustrates the channel response for a wireline channel having transformer coupling.

Referring to FIG. 3, there is shown the response function for a wireline channel, such as a coax transmission line. It can be seen that the low frequency response of the wireline channel rolls off, therefore resulting in a higher noise spectral density at low frequencies. In those wireline channels employing transformer coupling, such coupling introduces a high pass function in cascade with the wireline response. The composite response of the transformer coupled wireline channel is a bandpass function having a spectral null at DC. Due to the bandpass nature of a transformer coupled wireline channel, the efficient use thereof is achieved by a pulse of bandpass type, that is, one having a spectral null at DC. This will result in transmitting the data at baseband without the use of a carrier type system. The use of baseband transmission is an important aspect of the present invention since the existance of the spectral null at DC is an inherent part of the transmission medium.

The use of a carrier type system, as described in U.S. Pat. No. 4,135,057, calls for the use of a large ratio of a carrier type frequency-to-bandwidth in order to facilitate the design of low pass filters for rejecting the second harmonic terms generated by demodulation. The use of higher carrier frequencies requires more transmitter power, due to the increased attenuation of the wireline. Moreover, a carrier recovery system may be required at the receiver in addition to the timing recovery system. Furthermore, in order to share the wireline channel on a frequency division basis and in order to filter out any high frequency noise or interference as well as to reduce high frequency signal components that might be leaked to other systems, it is desirable to utilize a pulse which is bandlimited not to exceed a maximum bandwidth. This results in transmitting the data at baseband without the use of a carrier type system. The use of baseband transmission is an important aspect of the present invention since the existance of the spectral null at DC must be contended with.

FILTERED MANCHESTER CODED PSK

Figure 4:
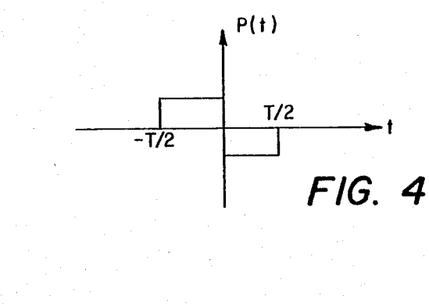
FIG. 4 illustrates a Manchester Coded PSK pulse.

Referring to FIG. 4, there is shown a Manchester Coded PSK pulse in the time domain defined by the function p(t) with a period of T. The particular pulse illustrated illustrates a transition from a positive polarity pulse to a negative polarity pulse. To indicate a logic "high" state the Manchester Coded PSK pulse makes the transition from a positive-going pulse to a negative-going pulse. To indicate a logic "low" pulse, the Manchester Coded PSK pulse makes a transition from a negative-going pulse to a positive-going pulse. It should be understood that the transition is the logic state indicator, therefore requiring the pulse to be sampled at the transition time.

Manchester coding provides a means to transmit a two state digital signal without a DC component. This is because only the transition is involved rather than the actual level of the signal. However, the receiver must determine whether the signal is at one polarity or the other to determine if a transition has been made between the two polarities.

Figure 5:
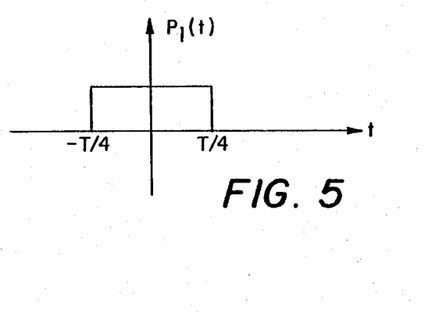
FIG. 5 illustrates a linear combination of two square pulses displaced in time.

For purposes of analysis, the Manchester Coded pulse can be represented as a linear combination of two square pulses displaced in time where:

$$p(t) = p_1(t+T/4) - p_1(t-T/4) \qquad (10)$$

where the time domain response for $p_1(t)$ is illustrated in FIG. 5.

The Fourier transforms of p(t) and $p_1(t)$ are respectively:

$$P(f) = j2\pi \frac{\sin^2 \pi fT/2}{\pi fT} \cdot -\infty < f < \infty \qquad (11)$$

-continued
$$P_1(f) = \frac{T}{2} \frac{\sin \pi fT/2}{\pi fT/2} \cdot -\infty < f < \infty \quad (12)$$

Figure 6:
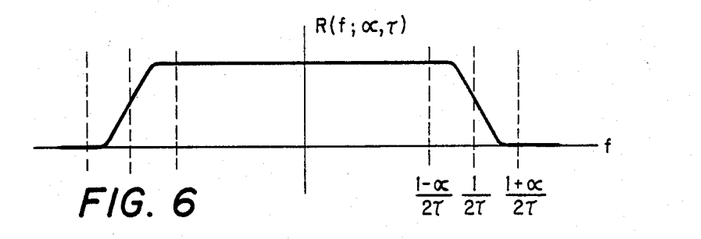
FIG. 6 illustrates the frequency spectrum of a raised cosine pulse.
Figure 7:
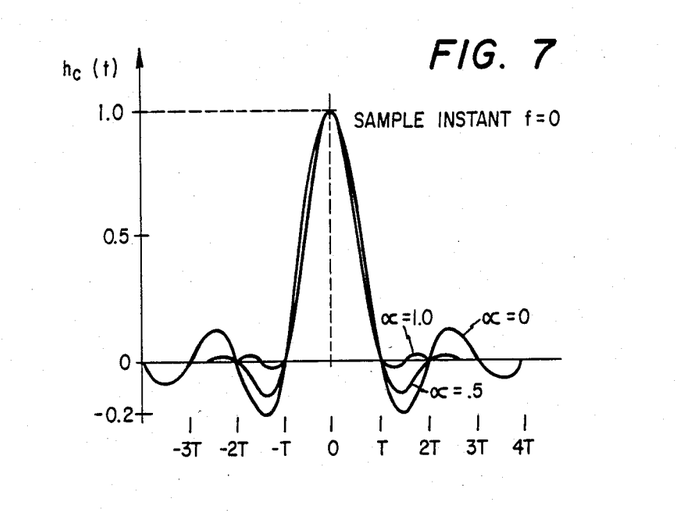
FIG. 7 illustrates a raised cosine pulse in the time domain.

The particular type of pulse chosen for the present invention for operation in the bandlimited channel of the present invention is a raised cosine pulse. A raised cosine pulse is denoted by $r(t; \alpha, \tau)$, wherein $\alpha$ is the excess bandwidth and $\tau^{-1}$ is the signaling rate and is defined by the equation:

$$r(t;\alpha,\tau) = \left[\frac{\sin \pi t/\tau}{\pi t/\tau}\right] \left[\frac{\cos \alpha \pi t/\tau}{1-4\alpha^2(t/\tau)^2}\right] \quad 1 \leq \alpha \leq 2 \quad (13)$$

where $R(f; \alpha, \tau)$ represents the Fourier transform of $r(t; \alpha, \tau)$ which is represented in FIG. 6. The raised cosine pulse function of equation 13 in the time domain is illustrated in FIG. 7 for several values of $\alpha$. For all values of $\alpha$, the function has the value of zero at the sample instants $t=n\tau$, $n=1,2,\ldots$ Thus, with the raised cosine pulse function, signalling can occur at a rate of $1/\tau$ with zero intersymbol interference. However, it can be seen from the frequency response of FIG. 6 that a raised cosine channel requires the channel response to pass DC spectral components to maintain signal integrity. Since the wireline channel would be at a disadvantage for a raised cosine channel due to the poor low frequency response thereof, other methods must be employed to transmit and receive the data.

For simplicity of description, some of the basic steps in arriving at the present invention will be described. The transmitter is initially chosen to have a low pass filter transfer function of $H_T(f)$ which is defined as:

$$H_T(f) = \frac{\sqrt{R(f; \alpha, T/2)}}{T/2 \frac{\sin \pi fT/2}{\pi fT/2}} \quad (14)$$

The receiver is partitioned into two filters with transfer functions $H_{R1}(f)$ and $H_{R2}(f)$ where $H_{R1}(f)$ is defined as:

$$H_{R1}(f) = \sqrt{R(f; \alpha, T/2)} \quad (15)$$

If $H_T(f)$ and $H_{R1}(f)$ are cascaded the result is:

$$H_T(f)H_{R1}(f) = \frac{R(f; \alpha, T/2)}{T/2 \frac{\sin \pi fT/2}{\pi fT/2}} \quad (16)$$

or, from equation 12:

$$H_T(f)H_{R1}(f) = \frac{R(f; \alpha, T/2)}{P_1(f)} \quad (17)$$

Figure 8:
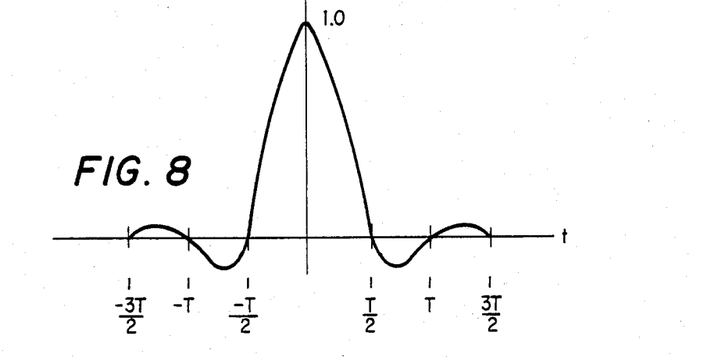
FIG. 8 illustrates a raised cosine pulse in the time domain with a signalling rate of T/2.
Figure 9:
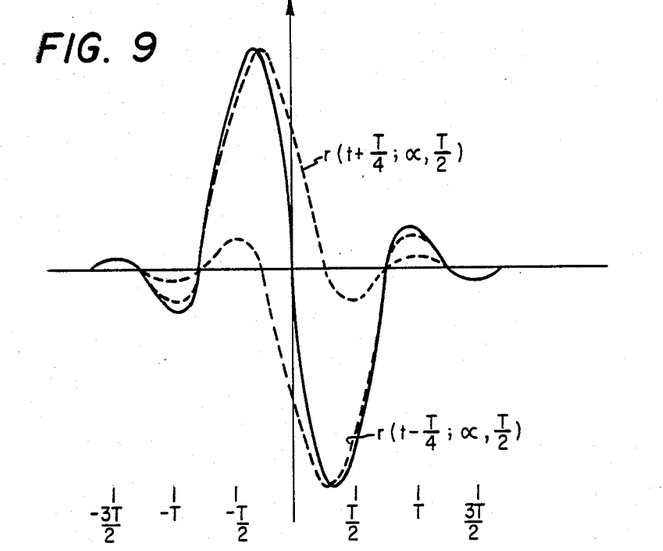
FIG. 9 illustrates the super-position of two raised cosine pulses of opposite polarity and shifted by T/2.

From equation 17, it can be seen that if the filter cascade $H_T(f)H_{R1}(f)$ is excited by a pulse $p_1(t)$, the output of the receive filter transfer function $H_{R1}(f)$ is a raised cosine pulse $r(t; \alpha, T/2)$ with a signaling rate of $(T/2)^{-1}$, which is illustrated in FIG. 8. It can be seen that the raised cosine pulse in FIG. 8 has a zero value at $-T/2$ and $T/2$ and also at $-T$ and $T$. Since the filters are linear and time invariant, if the filter cascade $H_T(F)H_{R1}(F)$ is excited by the Manchester Coded pulse $p(t)$, as defined by equation 10, the output of the receive filter transfer function $H_{R1}(f)$ is the superposition of two raised cosine pulses, $r(t+T/4; \alpha, T/2) - r(t-T/4; \alpha, T/2)$, each having a signaling rate of $(T/2)^{-1}$, which is illustrated in FIG. 9 by the solid line therein.

Note that, were the output of the received filter transfer function $H_{R1}(f)$ to be sampled at times $t_k = kT/2 + T/4$, $k = \ldots, -1, 0, 1, \ldots$, the sampled output $f_K$ would be:

$$f_k(t_k) = \begin{cases} 0 & k \neq -1, 0 \\ 1 & k = -1 \\ -1 & k = 0 \end{cases} \quad (18)$$

From equation 16, it can be seen that for $k=-1$ the sampled output would have a value of 1 and for $k=0$, the sampled output would have a value of $-1$. With this information, a Manchester coded PSK pulse could be reconstructed by selectively sampling the signal of FIG. 9 and deriving the original logic signal therefrom.

To operate on a wireline channel, it is necessary to derive an overall bandpass function. In so doing, the response of the communications channel at low frequencies can virtually be ignored. As described above, the receiver transfer function was partitioned into $H_{R1}(f)$ and $H_{R2}(f)$ with $H_{R1}(f)$ described in equation 15. An optimal process of the data requires calculation of the difference $f_k(T/4) - f_k(T/4)$ in order to coherently combine the energies from the two pulses. This may be achieved by passing the waveform that is output by the receive filter transfer function $H_{R1}(f)$ through an analog filter with a transfer function;

$$H_{R2}(f) = -[1 - e^{-j\pi fT}] \quad (19)$$

and by sampling the output at times $t_k = kT + T/4$, $k = \ldots, -1, 0, 1, \ldots$, the output sample sequence would be:

$$g_k = \begin{cases} 2 & k = 0 \\ 0 & k \neq 0 \end{cases} \quad (20)$$

Figure 10:
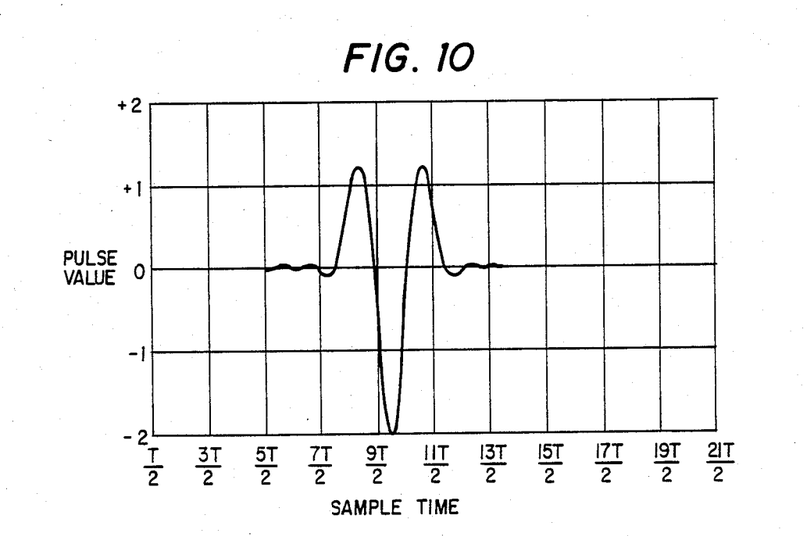
FIG. 10 illustrates a quasi-raised cosine pulse in the time domain.

The output of the transfer function $H_{R2}(f)$, which is a bandpass function, is shown in FIG. 10.

Referring further to FIGS. 9 and 10, it can be seen that the overall effect of the transfer function $H_{R2}(f)$ is to invert the waveform of FIG. 9 at $-T/4$ and shift it by $T/2$. This results in a summation with the waveform at $+T/4$, thereby providing a pulse that can be sampled at $T/4$ to recover the data information originally formatted in the Manchester Coded PSK. In addition, and an important aspect of the present invention, the output of the cascaded network having the transfer function $H_T(f)H_{R1}(f)H_{R2}(f)$ has no DC component, thereby retaining signal integrity on a wireline channel.

Consequently, the filter cascade $H_T(f)H_{R1}(f)H_{R2}(f)$, when excited by a Manchester Coded pulse $p(t)$, produces at its output a pulse having zero intersymbol interference. This pulse is termed a "quasi-raised cosine pulse" since it is similar to a conventional raised cosine pulse. Furthermore, since both $p(f)$ and $H_{R2}(f)$ are of a bandpass type, the output pulse is a bandpass pulse, thereby increasing the system's immunity to low frequency noise and facilitating the linear equalization of the wireline channel having a spectral null at DC. Moreover, the system described above achieves the error rate performance of binary antipodal signaling in the presence of white gaussian noise on a flat, nonfrequency selective channel. The optimality follows from the fact that $H_{R1}(f)$, sampled at times $T=T/4$ and $T=T/4$, defines matched filters for the two orthogonal waveforms that result from passing the time shifted pulses $p_1(t+T/4)$ and $-p_1(t-T/4)$ through $H_T(f)$. $H_{R2}(f)$ therefore performs an optimal predetection combination of the two sampled outputs.

In effect, the Manchester Coded pulse p(t) that was input to the cascaded filters has been converted to a series of quasi-raised cosine pulses at the output of the receiver, of which one of these pulses is shown in FIG. 10. The correlation of these quasi-raised cosine pulses with the initial data will be illustrated in a later figure with reference to an example herein below.

NETWORK REALIZATION AND OPTIMIZATION

To realize the transfer functions described above, it is necessary to provide practical filter networks that closely approximate the idealized passive pulse shaping network functions. The filters outlined herein are used to implement a time domain filter based on shaping input pulses into desired output pulse shapes. It should be understood that this is to be contrasted with conventional analog filter designs which are approached from the frequency domain point of view with no precise control of the network pulse response. Use of conventional approaches for pulse transmission systems invariably involve compromises between frequency response and intersymbol interference in the time domain caused by bandlimiting.

Three filter design problems arise in the realization of the transmit and receive filters for the filtered Manchester Coded system for a frequency non-selective channel. First, the transmitter filter transfer function $H_T(f)$ must be approximated. Second, the receiver bandpass filter transfer function $H_{R1}(f)H_{R2}(f)$ must be approximated. Third, phase equalizers must, in general, be included to provide needed degrees of freedom to permit matching of transmitter and receiver phase characteristics. In addition, if significant frequency selective attenuation is present, slope equalizers must be included to flatten the amplitude response.

Figure 11:
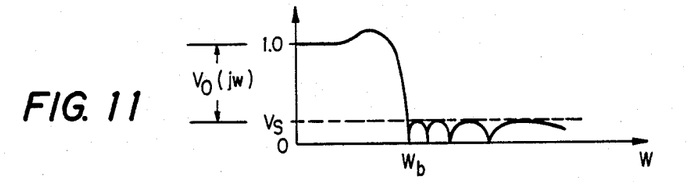
FIG. 11 illustrates the frequency response of a low pass filter for the transmitter.

An attractive realizable filter for use as the low pass filter at the transmitter is one with an equal-ripple stopband frequency response such as that illustrated in FIG. 11. A low pass prototype frequency response transfer function for an equal-ripple stopband filter is given by:

$$G(s) = \sum_{i=1}^{N} \frac{R_i}{s - s_i} \quad (21)$$

where $$R_i = Kz_i \prod_{\substack{j=1 \\ \neq i}}^{N} \frac{z_i + z_j}{s_i - s_j}$$

and $z_i^2 = s_i^2 - w_b^2$ where G(s) is the filter transfer function expressed in terms of the LaPlace transform complex variable, s. The lower edge of the stopband is $w_b$ and k is the maximum gain in the stop band. This transfer function is used to approximate the desired transmitter pulse shaping filter frequency characteristics, [Define s, $s_i$ and $z_i$] where $z_i$ and $s_i$ are the complex zeros and poles respectively of the transfer function.

For the low ratio of center frequency-to-band width of the receiver bandpass filter transfer function, it is convenient to realize this filter transfer function as the cascade of a low pass filter and a high pass filter. An equal-ripple stopband filter, such as that described above, is used for the receiver low pass filter. A simple one pole high pass filter with a transfer function $$H_1(s) = s/(s + w_c) \quad (22)$$

has been found satisfactory for use in cascade with the above low pass filter at the receiver.

If a significant amount of slope exists in the frequency response of the wireline channel across the bandwidth of the signal, then an amplitude equalization filter must be concatenated with the above filters in order to flatten the frequency response of a channel. Such a filter may be realized as a cascade of sections each having the form $$H_{eqi} = (s - z_i)/s - p_i \quad (23)$$

The poles and zeros of the slope equalizer are adjusted such that the product of the slope equalizer amplitude response and the channel amplitude response is approximately constant across the bandwidth occupied by the signal.

These filters must in turn be concatenated with an all-pass equalizer to provide the needed degrees of freedom to permit matching of the transmitter and the phase characteristics thereof. The equalizer does not change the amplitude response but can be used to improve the overall network phase linearity. An all-pass equalizer is described by the transfer function:

$$E(s) = \frac{K}{\pi} \prod_{i=-}^{} \frac{-s - s_i}{s - s_i}; \text{Re } s_i > 0 \quad (24)$$

The zeros of E(s) are mirror images of the network poles. The passive pulse shaping transmitter filter then becomes $H_t(j\omega) = G_T(j\omega)E_T(j\omega)$, and the receiver pulse shaping filter is $H_{RX}(j\omega) = G_R(j\omega)E_R(j\omega)$. The pole of $G_R(jw)$ and $G_T(jw)$ are selected to yield good approximations to the desired amplitude response as a function of frequency and the respective equalizers are designed to compensate for non-linear phase.

Selecting these particular transfer functions for G(s) and E(s) has the advantage that final adjustment of the filter and the equalizer poles and zeros is made to yield the desired time domain samples. The composite transfer function of the transmitter and the receiver passive pulse shaping networks is:

$$H(s) - G_T(s)E_T(s)G_R(s)E_R(s). \quad (25)$$

The transform of the output pulse is given by $H_C(s) = H(s)P(s)$. This transform may be evaluated at frequencies $f_i$ and a fast Fourier transform algorithm then used to calculate values of the pulse response $h_c(t_j)$ at sample times $t_j$. The difference between $h_c(t_j)$ and the desired sample values may be formulated and the optimal pole locations of the low pass filters and optimal poles and zeros of the slope equalizer found to minimize the sum squared error of the difference while also meeting frequency domain amplitude constraints. There therefore exists the relationship $$\delta = \Sigma[h_c(t_j) - h_c(t_j)]^2 \qquad (26)$$

where $h_c(t_j)$ is the desired sample value at time $t_j$. Examination of the above relationship reveals that the squared error is a function only of the pole locations of the low pass filters, the high pass filter and the phase equalizer, and of the pole and zero location of the slope equalizer. Therefore, the squared error may be minimized with respect to these parameters using non-linear programming methods. The optimization is carried out in the time domain with specified high frequency attenuation in the frequency domain.

TIMING RECOVERY FOR FILTERED MANCHESTER CODED PSK

To obtain optimal performance from a digital data transmission system, it is necessary to derive from the received signal a timing signal of frequency equal to the incoming data symbol rate and in phase with incoming symbols. This timing signal is necessary to ensure that the waveform at the output of the receiver pulse shaping filter is sampled at the correct times to maximize signal-to-noise ratio and minimize intersymbol interference. In the present invention, the output waveform is a series of quasi-raised cosine pulses of the type shown in FIG. 10 that correspond to a logic "high" or a logic "low".

Figure 12:
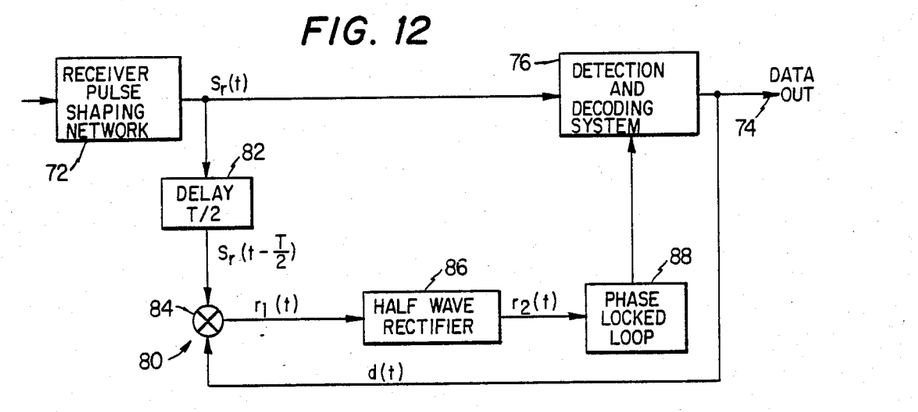
FIG. 12 illustrates a schematic block diagram for the timing recovery circuit of the receiver.

Referring to FIG. 12, there is shown a block diagram for the timing recovery circuit 80 of FIG. 1. A delay circuit 82 receives the signal $s_r(t)$ from the terminal 74 and outputs a signal $s_r(t-T/2)$ that is delayed by a time $T/2$. The output of the delay circuit 82 is input to a multiplication circuit 84 that receives both the signal $s_r(t-T/2)$ and the signal from the output terminal 78 that is the antipodal data output $d(t)$. The output of the multiplication circut is a product signal $r_1(t)$ and this signal is input to a halfwave rectifier 86. The halfwave rectifier 86 rectifies the signal $r_1(t)$ and outputs a signal $r_2(t)$. The output signal $r_2(t)$ is input to a phase locked loop 88. The output of the phase locked loop is connected to the input of the detection and decoding system 76.

As an example of a 32 bit string that would be transmitted over the data transmission system, Table 1 illustrates a 32 bit data string having a variety of "low" logic states represented by a zero and "high" logic states represented by a 1.

TABLE 1

| Bit Position | Value | Bit Position | Value |
|---|---|---|---|
| 1 | 0 | 17 | 1 |
| 2 | 0 | 18 | 1 |
| 3 | 0 | 19 | 1 |
| 4 | 1 | 20 | 0 |
| 5 | 1 | 21 | 0 |
| 6 | 1 | 22 | 0 |
| 7 | 0 | 23 | 1 |
| 8 | 0 | 24 | 1 |
| 9 | 0 | 25 | 1 |
| 10 | 0 | 26 | 1 |
| 11 | 0 | 27 | 1 |
| 12 | 1 | 28 | 0 |
| 13 | 0 | 29 | 1 |
| 14 | 1 | 30 | 0 |
| 15 | 1 | 31 | 0 |
| 16 | 0 | 32 | 1 |

Figure 13:
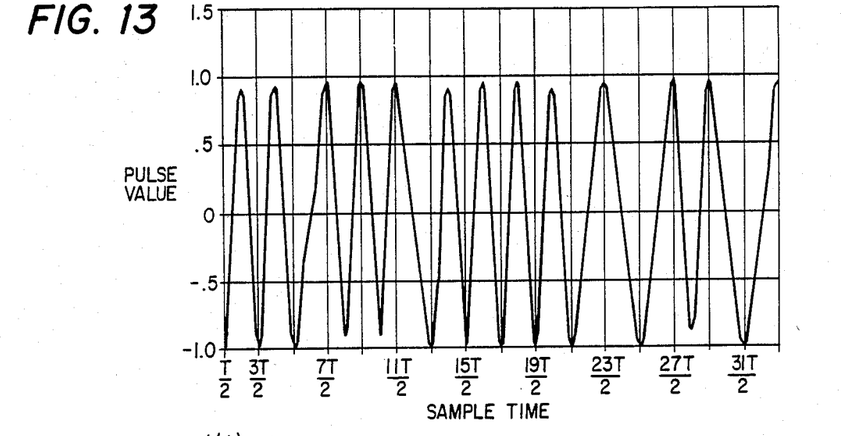
FIG. 13 illustrates the output of the receiver pulse shaping network.

As described above, the output of the receiver pulse shaping network 32 is a sequence of quasi-raised cosine pulses. The bit string of Table 1 is illustrated in FIG. 13 and shows the series of quasi-raised cosine pulses that correspond to the data of Table 1. For simplicity, only a length of 16 bauds is illustrated. When a zero occurs, a negative-going quasi-raised cosine pulse occurs and when a 1 is present, a positive-going quasi-raised cosine pulse is present. The amplitude of both the negative-going and the positive-going quasi-raised cosine pulses is 1.

Referring further to FIG. 13, it can be seen that the waveform is sampled every T seconds at multiples of $T/2$. The value of the quasi-raised cosine pulse at the sample times is a $-1$ at $T/2$ which corresponds directly to the bit position 1. In like manner, at sample times $3\ T/2$ and $5\ T/2$, the value is also $-1$ which corresponds to bit positions 2 and 3 which are also a logic 0. The remaining data bits shown in FIG. 13 correspond to bit positions up to bit position 16 of Table 1.

Figure 15:
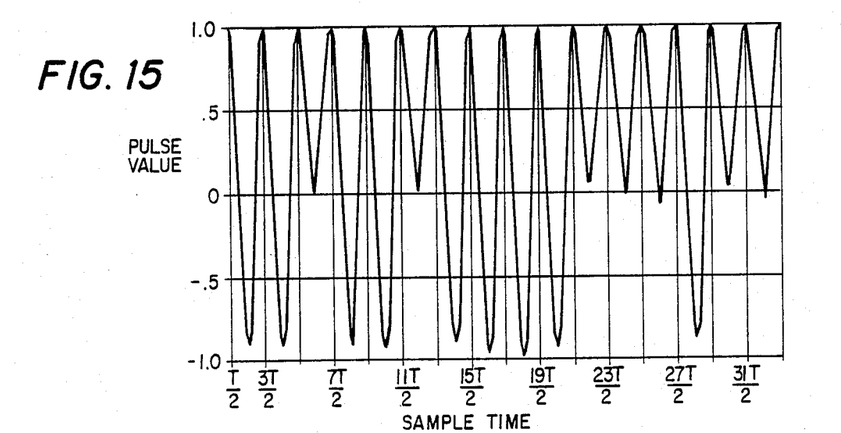
FIG. 15 illustrates the product of the antipodal data signal and the output of the receive filter.
Figure 16:
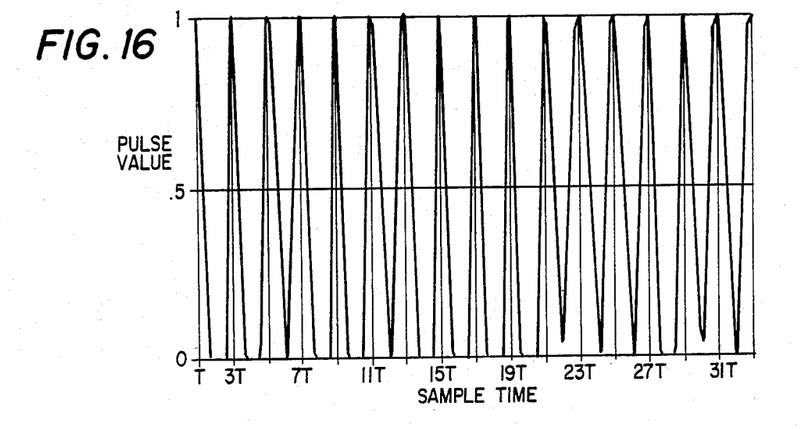
FIG. 16 illustrates the half-wave rectified output of the multiplier.
Figure 17:
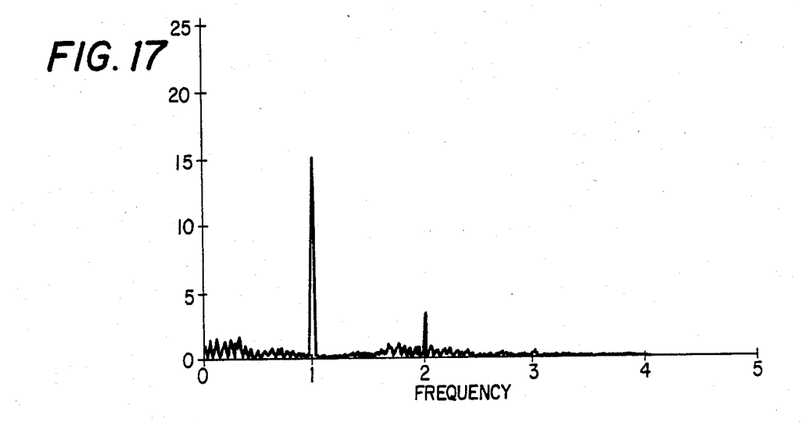
FIG. 17 illustrates the frequency spectrum of the signal in FIG. 16.

The waveform $s_r(t)$ in FIG. 13 is multiplied by the antipodal data signal $d(t)$ that is shown in FIG. 14. The output of the multiplication circuit $r_1(t)$ 84 is shown in FIG. 15. The product $r_1(t)$ is halfwave rectified to produce the reference signal $r_2(t)$, illustrated in FIG. 16. The spectrum of $r_2(t)$ is illustrated in FIG. 17. It is apparent that $r_2(t)$ contains a strong component at the fundamental frequency $1/T$ Hz. To attenuate the distortion in $r_2(t)$ and to provide a clock signal 90° out of phase with $r_2(t)$ to control the detection, the output of the phase locked loop 88 is locked to $r_2(t)$.

Figure 18:
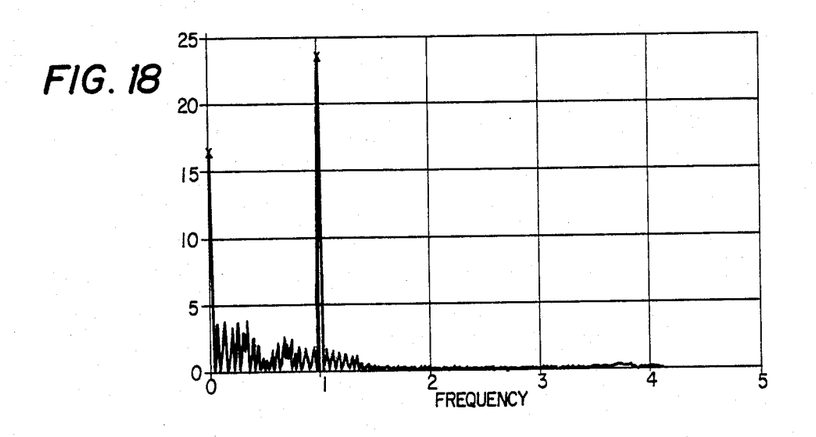
FIG. 18 illustrates the frequency spectrum of the output of the multiplier without half-wave rectification.

In an another embodiment of the present invention, the halfwave rectifier may be deleted or a biased halfwave rectifier may be utilized. If the halfwave rectifier is deleted, the phase locked loop input is the signal $r_1(t)$, which, for the previously defined periodic data sequence in Table 1, has the spectrum shown in FIG. 18.

Figure 19:
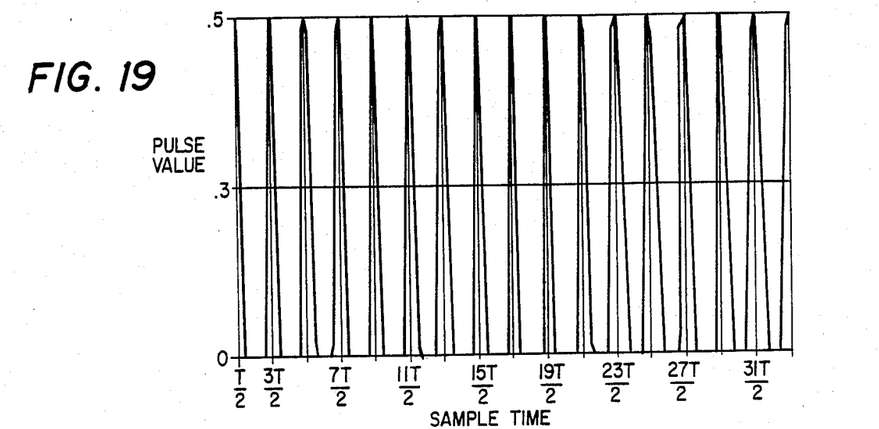
FIG. 19 illustrates the output of the multiplier that is half-wave rectified after biasing to one-half the peak value.
Figure 20:
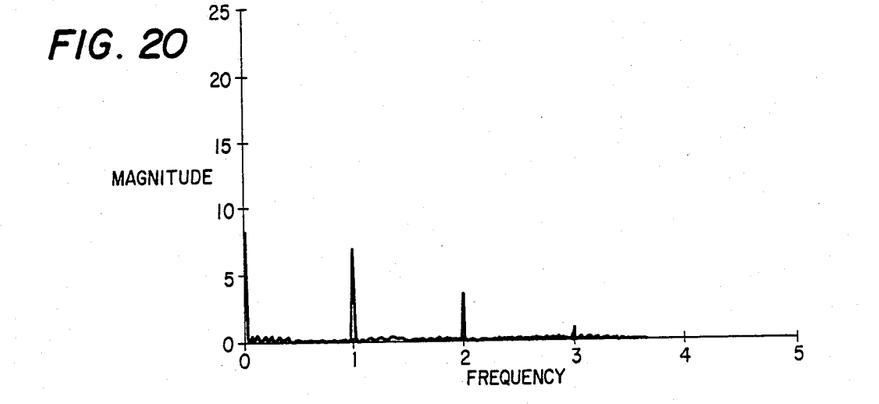
FIG. 20 illustrates the frequency spectrum of the waveform in FIG. 19.

For the case of a biased halfwave rectifier that is biased to one-half the peak value of $r_1(t)$, the input to the phase locked loop would be as illustrated in FIG. 19, and for the previous defined periodic data sequence of Table 1, the spectrum of the phase lock loop input is as illustrated in FIG. 20.

RECEIVER STARTUP PROCEDURE

Since the data output of the detection system is fed back to the timing recovery circuit, some provision must be made for the initial acquisition of a timing signal to prevent loss of data on initiation of transmission. For the filtered Manchester Coded PSK system herein described, this may be accomplished using many known data sequences as preambles to the initial transmission. One of the simplest and most effective preambles is one consisting of a sequence 1 ... 1 ..., which produces at the receiver pulse shaping filter output a signal $f(t) = K_1 \cos 2\pi t/T$. Setting the signal $d(t)$ on the output terminal 38 to a positive constant that is independent of the recovered timing signal ensures that the phase lock loop 88 is a signal of the form $K_2 \sin 2\pi t/T$, having a transition precisely at the desired sampling points.

AN EXAMPLE FILTER DESIGN

The following is an example filter design for a digital transmission using filtered Manchester Coded PSK on a flat channel for which no slope equalization is required. The transmit filter is a three-pole equiripple stopband design having 20 dB stopband attenuation. The receive low pass filter is a three-pole equiripple stopband design having 30 dB of stopband attenuation. The receive high pass filter is a one-pole filter, and the phase equalizer has one pair of complex conjugate poles and zeros.

Optimization of the pole location, in which pole and zero locations are in radian frequency, scaled by 1/T, the channel symbol rate, is illustrated in Table 2.

TABLE 2

| Transmit Low Pass Filter | |
|---|---|
| −2.18 + j8.86 | Pole 1 |
| −2.18 − j8.86 | Pole 2 |
| −8.53 + j0 | Pole 3 |
| 0.00 + j14.12 | Zero 1 |
| 0.00 − j14.12 | Zero 2 |
| Receive Low Pass Filter | |
| −2.187 + j7.16 | Pole 1 |
| −2.187 − j7.16 | Pole 2 |
| −3.64 + j0 | Pole 3 |
| 0.00 + j14.21 | Zero 1 |
| 0.00 − j14.21 | Zero 2 |
| Receive High Pass Filter | |
| −3.52 + j0 | Pole 1 |
| 0 + j0 | Zero 1 |
| Phase Equalizer | |
| −2.69 + j4.23 | Pole 1 |
| −2.69 − j4.23 | Pole 2 |
| 2.69 + j4.23 | Zero 1 |
| 2.69 − j4.23 | Zero 2 |

Figure 21:
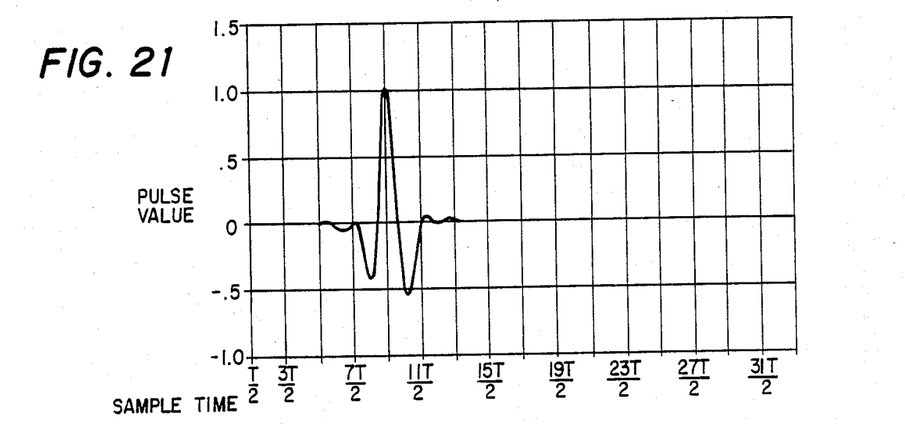
FIG. 21 illustrates the quasi-raised cosine response of an example filter design.

The pulse response of the filter having the parameters of Table 2, when excited by a Manchester Coded PSK pulse, is illustrated in FIG. 21. From the pole and zero values produced by the optimization, element values were synthesized to realize the transmit and receive filters for a symbol rate of 8.192 Mbps. The realized designs are illustrated in FIGS. 22-25.

Figure 22:
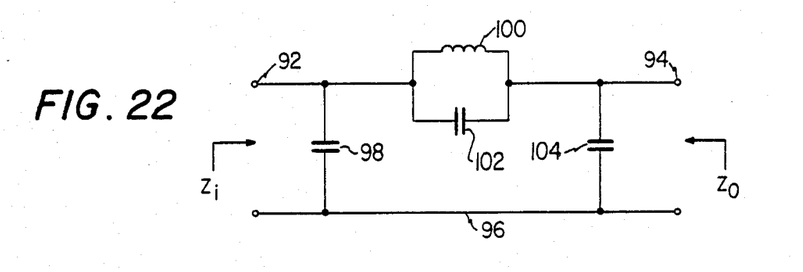
FIG. 22 illustrates an example transmit low pass filter.

Referring to FIG. 22, there is illustrated a circuit for a transmit low pass filter $H_T$ which is equivalent to the box labeled $H_T(f)$ of FIG. 2. The filter $H_T$ has an input terminal 92, and output terminal 94 and a reference terminal 96. The input impedance $Z_i$ across the input terminal 92 and the reference terminal 96 is designed to be equal to 75 ohms and the output impedance $Z_o$ across the output terminal 94 and the reference terminal 96 is designed to equal 37.5 ohms. A capacitor 98 has one end thereof connected to the input terminal 92 and the other end thereof connected to the reference terminal 96. An inductor 100 has one end thereof connected to the input terminal 92 and the other end thereof connected to the output terminal 94. A capacitor 102 has one end thereof connected to the input terminal 92 and the other end thereof connected to the output terminal 94. A capacitor 104 has one end thereof connected to the output terminal 94 and the other end thereof connected to the reference terminal 96.

Figure 23:
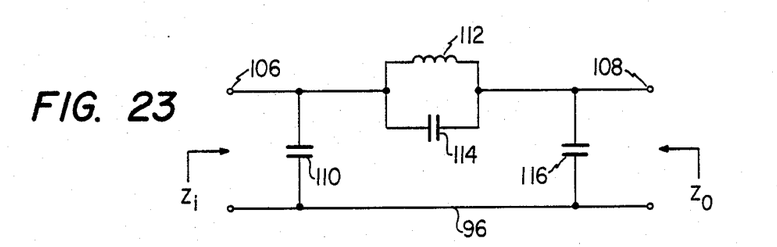
FIG. 23 illustrates an example receive low pass filter.

Referring to FIG. 23, there is shown a schematic of the receiver low pass filter $H_{R1}$ that represents the transfer function $H_{R1}(f)$ of equation 15. The filter $H_{R1}$ has an input terminal 106 and an output terminal 108. The reference terminal of the filter $H_{R1}$ is identical to the reference terminal 96 of FIG. 22. The filter $H_{R1}$ has an input impedance $Z_i$ and an output impedance $Z_o$ equal to 75 ohms. A capacitor 110 has one end thereof connected to the input terminal 106 and the other end thereof connected to the reference terminal 96. An inductor 112 has one end thereof connected to the input terminal 106 and the other end thereof connected to the output terminal 108. A capacitor 114 has one end thereof connected to the input terminal 106 and the other end thereof connected to the output terminal 108. A capacitor 116 has one end thereof connected to the output terminal 108 and the other end thereof connected to the reference terminal 96.

Figure 24:
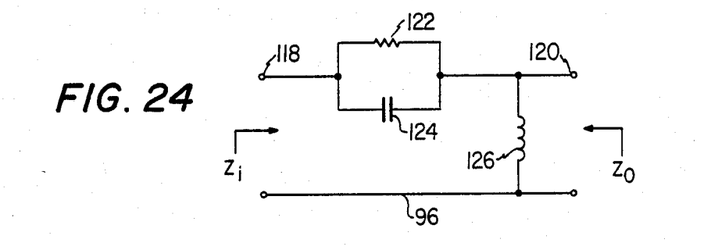
FIG. 24 illustrates an example receive high pass filter.

Referring now to FIG. 24, there is shown a schematic diagram of the receive high pass filter $H_{R2}$ which represents the transfer function $H_{R2}(f)$ of equation 19. The filter $H_{R2}$ has an input terminal 118, an output terminal 120 and a reference terminal identical to the reference terminal 96 of FIGS. 22 and 23. The filter $H_{R2}$ has an input impedance $Z_i$ equal to 75 ohms and an output impedance $Z_o$ equal to 75 ohms. A resistor 122 has one end thereof connected to the input terminal 118 and the other end thereof connected to the output terminal 120. A capacitor 124 has one end thereof connected to the input terminal 118 and the other end thereof connected to the output terminal 120. An inductor 126 has one end thereof connected to the output terminal 120 and the other end thereof connected to the reference terminal 96.

Figure 25:
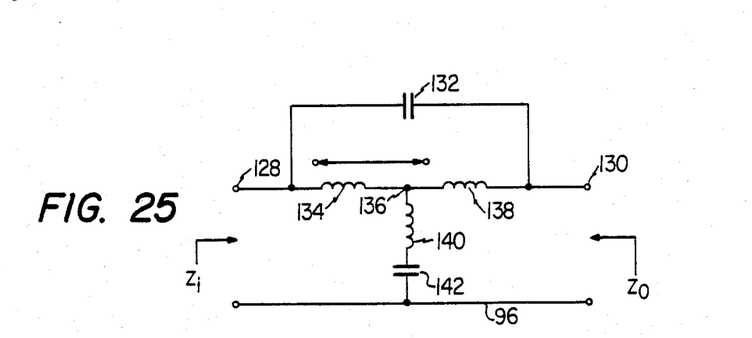
FIG. 25 illustrates an example phase equalizer.

Referring now to FIG. 25, there is shown a schematic diagram of the phase equalizer that is equivalent to the cascaded combination the transfer functions $H_{TE}(f)$ and $H_{RE}(F)$ of FIG. 2. The phase equalizer has an input terminal 128, an output terminal 130 and a reference terminal that is identical to the reference terminal 96 of FIGS. 22, 23 and 24. The input impedance of the phase equalizer is labeled $Z_i$ and is equal to 75 ohms. The output impedance of the phase equalizer is labeled $Z_o$ and is equal to 75 ohms. A capacitor 132 has one end thereof connected to the input terminal 128 and the other end thereof connected to the output terminal 130. An inductor 134 has one end thereof connected to the input terminal 128 and the other end thereof connected to a node 136. An inductor 138 has one end thereof connected to the output terminal 130 and the other end thereof connected to the node 136. The inductors 134 and 138 have a mutual inductance with a K factor equal to 0.9. An inductor 140 has one end thereof connected to the node 136 and the other end thereof connected to one end of a capacitor 142. The other end of the capacitor 142 is connected to the reference terminal 96.

The values for the circuits of FIGS. 22-25 are illustrated in Table 3.

TABLE 3

| Element | Value |
|---|---|
| TRANSMIT LOW PASS FILTER | |
| Capacitor 98 | 305 pF |
| Inductor 100 | 0.65 μH |
| Capacitor 102 | 114 pF |
| Capacitor 104 | 292 pF |
| RECEIVE LOW PASS FILTER | |
| Capacitor 110 | 751 pF |
| Inductor 112 | 1.1 μH |
| Capacitor 114 | 69 pF |
| Capacitor 116 | 209 pF |
| RECEIVE HIGH PASS FILTER | |
| Resistor 122 | 75 Ω |
| Capacitor 124 | 462 pF |
| Inductor 126 | 2.6 μH |
| PHASE EQUALIZER | |
| Capacitor 132 | 151 pF |
| Inductor 134 | 1.0 μH |
| Inductor 138 | 1.0 μH |
| Inductor 140 | 0.8 μH |
| Capacitor 142 | 697 pF |

In summary, there has been shown a transmission method for transmitting Manchester Coded PSK data on a wireline channel and outputting a series of positive- and negative-going quasi-raised cosine pulses. The signal is passed through a low pass filter on the transmit end and on the receive end an analog band pass filter is utilized consisting of a low pass filter and a bandpass filter to yield the quasi-raised cosine pulses that maintain their signal integrity without requiring a DC component. The cascaded filters provide the appropriate transfer functions to convert the Manchester Coded PSK into the series of quasi-raised cosine pulses. By sampling at the correct times, that is, coherent sampling, the original data can be derived from the quasi-raised cosine pulses. To coherently sample the data, it is necessary to extract the clock frequency from the receive data. This extracted closk is the result of multiplying the detected data and the delayed output of the cascaded filters to provide a reference signal for a phase lock loop. The result is a fairly uncomplicated circuit that detects data on a bandlimited channel without requiring a DC component in the frequency spectrum thereof.

Although the preferred embodiment of the invention has been described in detail, it should be understood that various changes, substitutions and alterations can be made therein without departing from the spirit and scope of the invention as defined by the appended claims.

We claim:

1. A method for digital transmission comprising:
   coding a binary antipodal data signal into a Manchester Coded PSK format;
   passing the coded data through a first transforming network having a transfer function of low pass type;
   transmitting the signal output by the first transforming network over a communications channel;
   receiving the transmitted data;
   passing the received data through a second transforming network having a second transfer function of low pass type to transform the signal into two superimposed raised cosine signals of opposite polarities and shifted in time by the signaling rate thereof;
   passing the signal output by the second transforming network through a third transforming network of bandpass type to transform the signal into a quasi-raised cosine signal; and
   coherently sampling the raised cosine signal to reconstruct the digital data signal.

2. The method of claim 1 wherein the step of coherent sampling comprises reconstructing a timing signal from the quasi-raised cosine signal and sampling the quasi-raised cosine signal at the signalling rate thereof.

3. The method of claim 2 wherein the step of reconstructing comprises:
   multiplying the quasi-raised cosine signal by the reconstructed data signal;
   halfwave rectifying the product signal; and
   locking a phase lock loop to the halfwave rectified product signal.

4. A system for digital transmission comprising:
   means for coding a digital data signal into a bandpass type format;
   a first low pass transforming network;
   a transmitter for transmitting the signal output by said first transforming network;
   a communications channel for receiving the output of said transmitter, said communications channel having a channel transfer function;
   a receiver for receiving the signal output by said communications channel;
   a second low pass transforming network for transforming the received signal into two superimposed raised cosine signals having equal and opposite polarities and shifted in time by the signalling rate thereof;
   a bandpass transforming network for transforming said superimposed raised cosine signals into a quasi-raised cosine signal to provide an output signal having no DC component; and
   means for coherently sampling said output signal to reconstruct said digital data signal.

5. The system of claim 4 wherein said bandpass type format comprises a Manchester Coded PSK format.

6. A system for digital transmission comprising:
   means for coding a digital data signal into a Manchester Coded PSK format;
   means for transforming said coded data by a first transfer function of low pass type;
   means for transmitting the data processed with said first transfer function over a communications channel;
   means for receiving the output of said communications channel;
   a low pass filter for transforming said transformed data into two superimposed raised cosine signals having equal and opposite polarities and shifted in time by the signalling rate thereof;
   a bandpass filter for transforming said superimposed raised cosine signals into a quasi-raised cosine signal; and
   means for coherently sampling said quasi-raised cosine signal to reconstruct said digital data signal.

7. The system of claim 6 wherein said means for transforming comprises a low pass filter.

8. The system of claim 6 wherein said means for coherently sampling comprises:
   a delay circuit for delaying said quasi-raised cosine signal;
   a sampling circuit for sampling said quasi-raised cosine signal and outputting a binary antipodal data signal;
   a multiplication circuit for multiplying the signal output from said delay circuit by said data signal; and
   a phase locked loop for receiving the output of said multiplication circuit, the output of said phase locked loop for controlling the sampling rate of said sampling circuit.

9. A system for digital transmission comprising means for coding a digital data signal into a Manchester Coded PSK format;
   a first low pass filter having a first transfer function for transforming said coded data;
   a communications channel for transmitting the output of said first low pass filter to a receiver;
   a second low pass filter having a second transfer function for receiving the transformed data from said first low pass filter that is transmitted over said communications channel;
   a bandpass filter having a third transfer function for receiving the output of said second low pass filter, said first and second low pass filters and said bandpass filter concatenated to transform said coded data signal into a quasi-raised cosine signal;
   a sampling circuit; and
   a timing signal recovery circuit for recovering the timing signal from said quasi-raised cosine signal for input to said sampling circuit such that said quasi-raised cosine signal is sampled at the optimum point.

10. The system of claim 9 wherein said timing recovery network comprises:
- a delay circuit for delaying said quasi-raised cosine signal;
- a multiplication circuit for receiving the reconstructed digital data signal output by said sampling network and the output of said delay circuit, said multiplication circuit outputting a product signal;
- a half wave rectifier for half wave rectification of said product signal; and
- a phase lock loop for receiving the output of said half wave rectifier and locking thereto.

* * * * *

UNITED STATES PATENT AND TRADEMARK OFFICE
CERTIFICATE OF CORRECTION

PATENT NO. : 4,507,794

DATED : March 26, 1985

INVENTOR(S) : Stephen K. Jones and Donald A. Johnston

It is certified that error appears in the above—identified patent and that said Letters Patent is hereby corrected as shown below:

Col. 4, line 66, change $\overset{"\infty"}{o}$ to $--\overset{\infty}{\underset{o}{\int}}--$.

Col. 5, line 9, change $\overset{"\infty"}{o}$ to $--\overset{\infty}{\underset{o}{\int}}--$.

Col. 5, line 14, change $\overset{"\infty"}{o}$ to $--\overset{\infty}{\underset{o}{\int}}--$.

Col. 5, line 28, change $\overset{"\infty"}{o}$ to $--\overset{\infty}{\underset{o}{\int}}--$.

Col. 5, line 47, change $\overset{"\infty"}{o}$ to $--\overset{\infty}{\underset{o}{\int}}--$.

Col. 11, line 1, change "h" to --ĥ--. (First occurrence)

Signed and Sealed this

Third Day of September 1985

[SEAL]

Attest:

DONALD J. QUIGG

*Attesting Officer*   Acting Commissioner of Patents and Trademarks - Designate